United States Patent
Rock

(10) Patent No.: US 7,604,267 B2
(45) Date of Patent: Oct. 20, 2009

(54) MODULAR DOCK BUMPER

(75) Inventor: Kenneth Rock, Tallmadge, OH (US)

(73) Assignee: Waltco Truck Equipment Company, Tallmadge, OH (US)

( * ) Notice: Subject to any disclaimer, the term of this patent is extended or adjusted under 35 U.S.C. 154(b) by 190 days.

(21) Appl. No.: 11/670,010

(22) Filed: Feb. 1, 2007

(65) Prior Publication Data

US 2007/0183849 A1    Aug. 9, 2007

Related U.S. Application Data

(60) Provisional application No. 60/765,248, filed on Feb. 3, 2006.

(51) Int. Cl.
   *B60R 19/44*    (2006.01)
   *B60R 19/48*    (2006.01)
   *B60R 3/00*     (2006.01)

(52) U.S. Cl. .................. 293/117; 293/143; 280/164.1

(58) Field of Classification Search .............. 293/117, 293/102, 143, 154; 280/164.1
   See application file for complete search history.

(56) References Cited

U.S. PATENT DOCUMENTS

| | | | |
|---|---|---|---|
| 2,660,454 A | | 11/1953 | Coumerilh |
| 3,210,110 A | | 10/1965 | Chieger |
| 3,675,947 A | * | 7/1972 | Blagg ........................ 280/500 |
| 3,912,299 A | * | 10/1975 | Carr ......................... 280/166 |
| 4,204,701 A | * | 5/1980 | Oltrogge ................. 280/491.5 |
| 4,541,661 A | | 9/1985 | Hawk |
| 4,688,656 A | * | 8/1987 | Kent ......................... 180/279 |
| 5,007,654 A | * | 4/1991 | Sauber ...................... 280/166 |
| 5,560,662 A | * | 10/1996 | Apgar et al. ............... 293/121 |
| 5,758,891 A | * | 6/1998 | Fox, Jr. ..................... 280/163 |
| 6,116,839 A | * | 9/2000 | Bender et al. .............. 414/401 |
| 6,612,595 B1 | * | 9/2003 | Storer ....................... 280/163 |
| 6,612,615 B1 | * | 9/2003 | Dimand ..................... 280/769 |
| 7,152,883 B2 | * | 12/2006 | Niemela .................... 280/759 |

* cited by examiner

*Primary Examiner*—Dennis H Pedder
(74) *Attorney, Agent, or Firm*—Emerson Thomson & Bennett; Roger D. Emerson; Timothy D. Bennett

(57) ABSTRACT

A dock bumper for minimizing damage to a back of a vehicle upon contacting a low-lying object may include a generally-rigid shock-absorbing member to be secured adjacent to a back portion of the vehicle. The shock-absorbing member may include a distal surface extended away from the back portion of the vehicle to contact a surface of a loading dock as the vehicle is operated in reverse, and a proximate surface positioned to contact a structural member at the back portion of the vehicle. A modular step may be coupled to the shock-absorbing member to dissipate at least a suitable portion of a force exerted on the step to minimize damage to the structural member contacting the proximate surface of the shock-absorbing member.

13 Claims, 5 Drawing Sheets

MODULAR DOCK BUMPER

This application claims priority to U.S. Ser. No. 60/765,248, entitled MODULAR DOCK BUMPERS, filed Feb. 3, 2006, which is incorporated herein by reference.

I. BACKGROUND OF THE INVENTION

A. Field of Invention

This invention pertains to the art of methods and apparatuses regarding protective equipment for vehicles, and more specifically to a dock bumper to be affixed to a trailer or other vehicle to minimize damage to the vehicle upon impacting another object.

B. Description of the Related Art

As trailers are backed into a loading dock to be loaded or unloaded, the truck driver relies primarily on mirrors to determine the proximity of the back end of the trailer to the loading-dock wall. For long trailers, this is a difficult task that often results in the back end of the trailer striking the terminal wall of the loading dock. Once such contact is made, the truck driver knows that the trailer is sufficiently close to the entrance of the loading dock to permit forklifts and other loading vehicles to enter the back of the trailer from the loading dock to insert or remove cargo.

It is known to provide dock bumpers on the back end of trailers adjacent to the entrance of the trailer's cargo area to absorb some of the force imparted on the trailers as they strike the wall of a loading dock. This way, as the back of the trailer strikes the wall, at least some of the forces exerted on the back of the trailer are dissipated by the dock bumpers to minimize damage to the back of the truck. As shown in FIG. 1, conventional dock bumpers 2 provided on the back end of trucks 3 are vertically-elongated structures that extend well below the lowest portion of the truck sill 4 or trailer frame relative to the ground, as shown in FIG. 1. Even with a triangular support 5 extending from the underside of the truck sill 4 to further support the overhanging portion of conventional dock bumpers 2, the conventional dock bumpers 2 still extend well beyond the lowermost surface of the support 5. This results in a cantilevered extension 6 that protrudes downwardly towards the ground and is not sufficiently supported to withstand impacts with low-lying objects.

Still referring to FIG. 1, the force from such an impact between the cantilevered extension 6 of a conventional dock bumper 2 and a low-lying object such as a curb in the direction of arrow 7 tends to impart a rotational force on the dock bumper 2. The rotational force causes rotation of the dock bumper 2 such that the cantilevered extension 6 is forced beneath the truck sill 4 or trailer frame. And since the dock-bumper 2 is a generally-rigid body, the non-cantilevered portion of the dock bumper 2 abutted against the truck sill 4 or trailer frame is forced in the opposite direction as shown by arrow 8. Movement of the non-cantilevered portion of the conventional dock bumper in this direction causes extension of the truck bed, body damage, and other harm that is expensive to repair.

Accordingly, there is a need in the art for a dock bumper that will minimize damage to a truck and trailer in the event of an impact between the dock bumper and a low-lying object. Such a dock bumper can absorb at least a portion of the force exerted on the back of the truck when contacting a loading-dock wall, and include features that respond to impacts with low-lying objects in a manner that minimizes the transmission of forces exerted on the back of the truck.

II. SUMMARY OF THE INVENTION

According to one embodiment of this invention, a dock bumper for minimizing damage to a back of a vehicle upon contacting a low-lying object is provided. The dock bumper may include a generally-rigid shock-absorbing member to be secured adjacent to a back portion of the vehicle. The shock-absorbing member may include a distal surface extended away from the back portion of the vehicle to contact a surface of a loading dock as the vehicle is operated in a reverse gear, and a proximate surface positioned to contact a structural member at the back portion of the vehicle. The proximate surface may be dimensioned to minimize a length of an overhanging portion of the dock bumper extending below a lowermost surface of the structural member at the back portion of the vehicle. A modular step may be coupled to the shock-absorbing member to dissipate at least a suitable portion of a force exerted on the step to minimize damage to the structural member contacting the proximate surface of the shock-absorbing member.

According to another embodiment of this invention, a trailer for receiving cargo from a loading dock and transporting the cargo to a destination is provided. The trailer may include a frame comprising a plurality of structural members for supporting the cargo, a wheel carriage for suspending a set of wheels from an underside of the frame, and a generally-rigid shock-absorbing member secured adjacent to a back of the trailer. The shock-absorbing member may include a distal surface extended away from the back of the trailer and oriented to contact a surface of a loading dock as the trailer is backed into the loading dock, and a proximate surface positioned to contact a structural member at the back of the trailer. The proximate surface may be dimensioned to minimize a length of an overhanging portion of the shock-absorbing member extending below a lowermost surface of the structural member at the back of the trailer. A modular step may be coupled to the shock-absorbing member to dissipate at least a suitable portion of a force exerted on the step to minimize damage to the structural member contacting the proximate surface of the shock-absorbing member.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
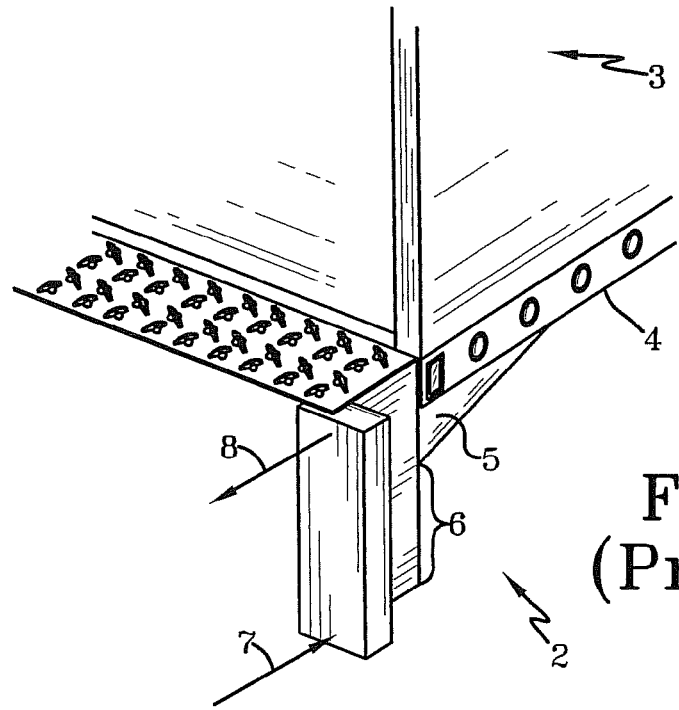
FIG. 1 is a perspective view of a prior art conventional dock bumper including a cantilevered extension protruding downwardly beyond a lowermost portion of a truck sill.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Figure 2:
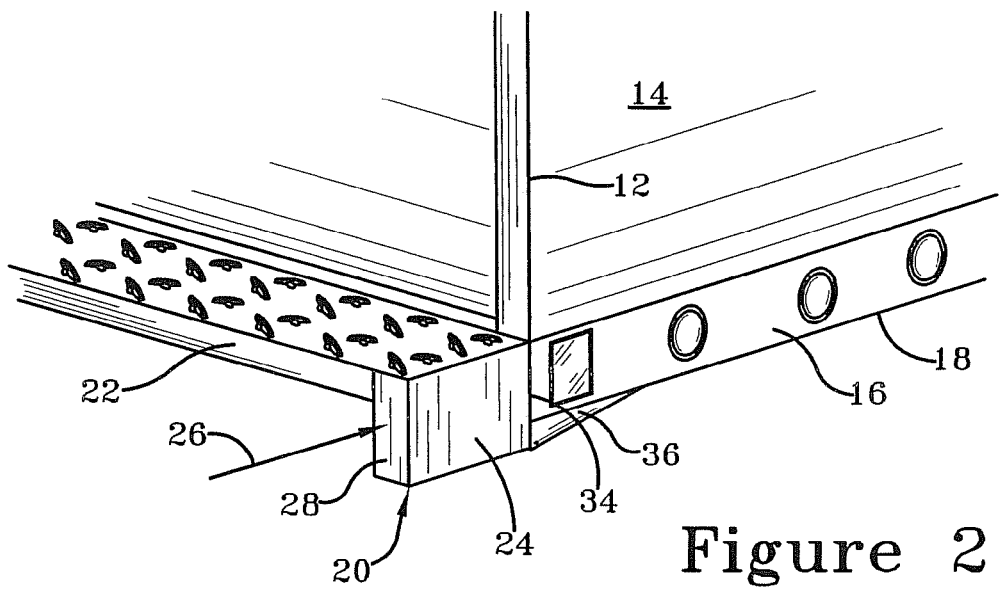
FIG. 2 is a perspective view of a dock bumper in accordance with one embodiment of the present invention.

FIG. 2 illustrates a back corner 12 of a trailer 14 of the type typically towed behind a tractor (not shown) for receiving cargo from a loading dock and transporting the cargo to a destination. Commonly, such trailers 14 include a frame comprising a plurality of structural members 16 for supporting the weight of the cargo. On the frame can be constructed a canopy, a bed, or other features adapted for transporting a particular type of cargo to a desired destination. A wheel carriage is affixed to the trailer 14 for suspending a set of wheels (not shown) from an underside 18 of the frame, allowing the trailer 14 to be towed over roadways by a tractor. A back step bumper 22 can suitably be provided to the back end of the trailer for bridging a gap between the trailer and the loading dock over which the cargo is to travel when being transferred from the loading dock and received by the trailer. Thus, forklifts and other cargo-moving vehicles can be driven between a loading dock platform and the trailer 14. Other features, such as a lift gate (not shown), removable ramp (not shown), and the like can optionally be provided with the trailer 14 as desired.

With continuing reference to FIG. 2, although described above as forming the frame of a trailer 14 towed behind a tractor, the structural members 16 can form a rigid frame to which a cab for operating the truck is also attached. Examples of such trucks include what are commonly referred to as "box trucks," and the structural members 16 referred to herein also include structural members 16 of frames for these types of trucks. However, for the sake of clarity and brevity, the present invention will be described herein with reference to a trailer 14 towed behind a tractor.

To minimize damage to the trailer 14 when backing it into a loading dock, a dock bumper 20 may be secured adjacent to a back end of the trailer 14. The dock bumper 20 can be secured to the trailer 14 by any mechanical fastener such as a screw, bolt, rivet, clamp or the like; by any chemical fastener such as an adhesive or an epoxy, for example; or any other suitable form of fastener that can secure the dock bumper 20 to a structural member 16 adjacent to the back end of the trailer 14. Examples of suitable structural members 16 to which the dock bumper 20 can be secured include a member of a truck sill and a trailer frame. Alternately, the dock bumper 20 can be suspended from an overhanging portion of the back step bumper 22.

With continuing reference to FIG. 2, the dock bumper 20 may include a shock-absorbing member 24 made of a generally-rigid material that can transmit at least a portion of the force exerted thereon during an impact with a wall of a loading dock, or other structure, in the direction of arrow 26 to the structural member 16. The shock-absorbing member 24 may be a solid piece of plastic, rubber, synthetic resin, or a combination thereof; metal or metal alloy; any combination of the aforementioned materials; or any other material with sufficient durability to be repeatedly subjected to compressive forces between the trailer and a loading dock while substantially resiliently maintaining its shape. The shock-absorbing member 24 can suitably be reinforced or otherwise impregnated with support structures (not shown), and it can include a metal framework encased within a protective housing made of a plastic, rubber, synthetic resin, or any other durable material. Thus, as the trailer 14 is backed into the loading dock, the driver of the truck knows that the trailer 14 is properly positioned to receive the cargo from the loading dock when the shock-absorbing member 24 contacts a terminal wall of the loading dock. When the trailer 14 exits the loading dock, however, the substantially resilient shock-absorbing member 24 of the dock bumper 20 returns approximately to the shape it assumed before contacting the terminal wall of the loading dock.

Figure 3:
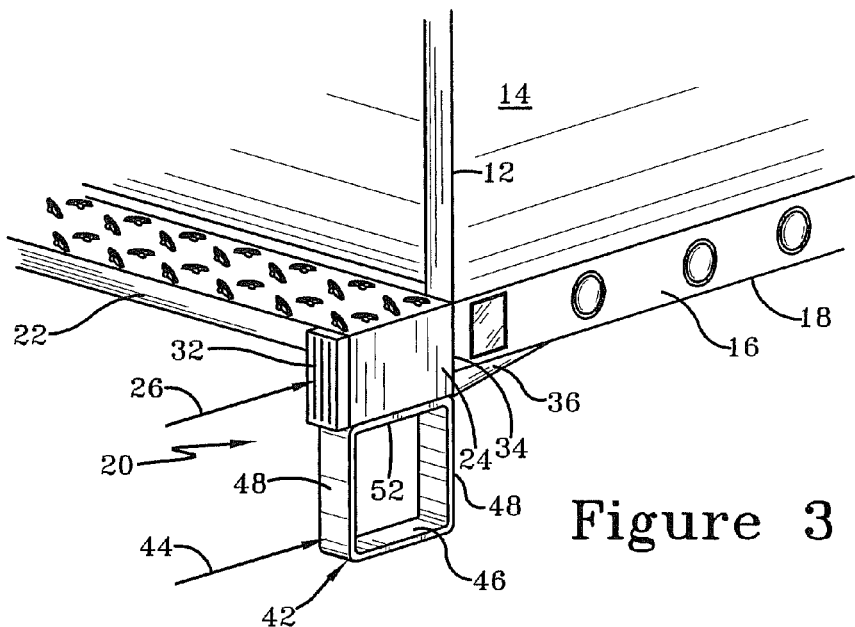
FIG. 3 is a perspective view of a dock bumper in accordance with another embodiment of the present invention that includes a modular step.

The shock-absorbing member 24 may include a distal surface 28 that extends away from the back end of the trailer 14 to which the dock bumper 20 is provided. The distal surface 28 is the exposed surface of the dock bumper 20 oriented to contact the terminal wall of a loading dock once the trailer 14 is backed all the way into the loading dock and is in a suitable position to receive the cargo. As shown in FIG. 3, the distal surface 28 can optionally be provided with a cushion 32 made from a rubber, or other soft and generally resilient material that can be deformed when compressed and return to substantially the same shape when the compressive force is removed. The cushion 32 can absorb at least a portion of the initial shock that would otherwise be experienced by the trailer 14 when the dock bumper 20 contacts the wall of the loading dock. Again, the cushion can be secured to the distal surface 28 with any mechanical fastener such as a screw, bolt, rivet, clamp or the like; by any chemical fastener such as an adhesive or an epoxy, for example; or any other suitable form of fastener that can secure the cushion 32 to the distal surface 28.

Still referring to FIG. 2, the shock-absorbing member 24 may include a proximate surface 34 that is positioned to contact the structural member 16 at the back of the trailer when the dock bumper 20 is installed on the trailer 14. The shock-absorbing member 24, and particularly the proximate surface 34, has dimensions that are about the same as the dimensions of the surface of the structural member 16 that the proximate surface 34 contacts. The dimensions of the shock-absorbing member 24 generally minimize a length of any overhanging portion of the shock-absorbing member 24 extending beyond a lowermost surface of the structural member 16 at the back of the trailer 14. Thus, when a compressive force is exerted on the shock-absorbing member 24, such as when the trailer is backed against the wall of the loading dock or other structure, at least a portion of the compressive force is transmitted linearly to the structural member 16 of the trailer 14 in the direction of arrow 26. The portion of the compressive force linearly transmitted to the structural member 16 by the shock-absorbing member 24 is at least sufficient to minimize, or even prevent the tendency of the shock-absorbing member 24 to rotate in a direction towards the underside 18 of the trailer 14.

With reference now to FIGS. 2-7, alternate embodiments include a shock-absorbing member 24 and proximate surface 34 that have dimensions different from those of the structural member 16, but according to such embodiments, the shock-absorbing member 24 is positioned generally coaxial with the structural member 16. Thus, the shock-absorbing member 24 is generally-linearly aligned with the structural member 16. And again, at least a portion of a compressive force exerted on the shock-absorbing member 24 is transmitted linearly to the structural member 16 of the trailer 14 in the direction of arrow 26. The portion of the compressive force linearly transmitted to the structural member 16 by the shock-absorbing member 24 is at least sufficient to minimize, or even prevent the tendency of the shock-absorbing member 24 to rotate in a direction towards the underside 18 of the trailer 14.

Figure 4:
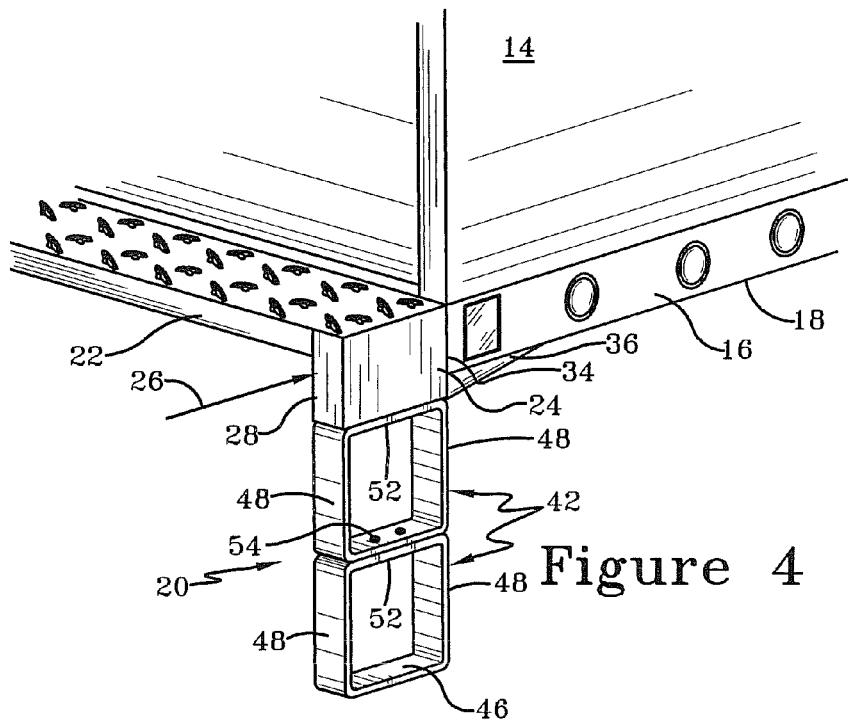
FIG. 4 is a perspective view of a dock bumper in accordance with yet another embodiment of the present invention that includes a plurality of modular steps.

With reference now to FIGS. 2-4, the dimensions of the structural member 16 include the dimensions of an optional brace 36 that can be installed on the trailer 14 to further support the shock-absorbing member 24 to maximize the linear transmission of the compressive force to the structural member 16 of the trailer 14. The brace can be a gusset, which is a generally triangular, metal brace used to strengthen joists, or any other suitable brace that can oppose the compressive force linearly transmitted by the shock-absorbing member 24. For this embodiment, the structural member includes not only the designated structural member 16, but also the brace 36.

Figure 5:
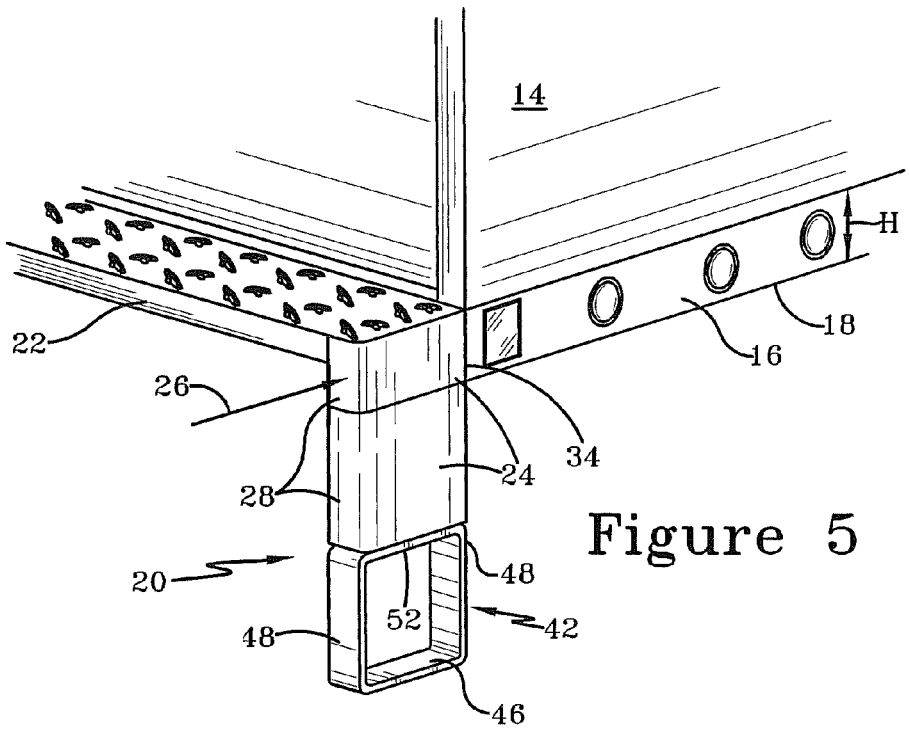
FIG. 5 is a perspective view of a dock bumper in accordance with another embodiment of the present invention that includes a plurality of shock absorbing members and a modular step.
Figure 6:
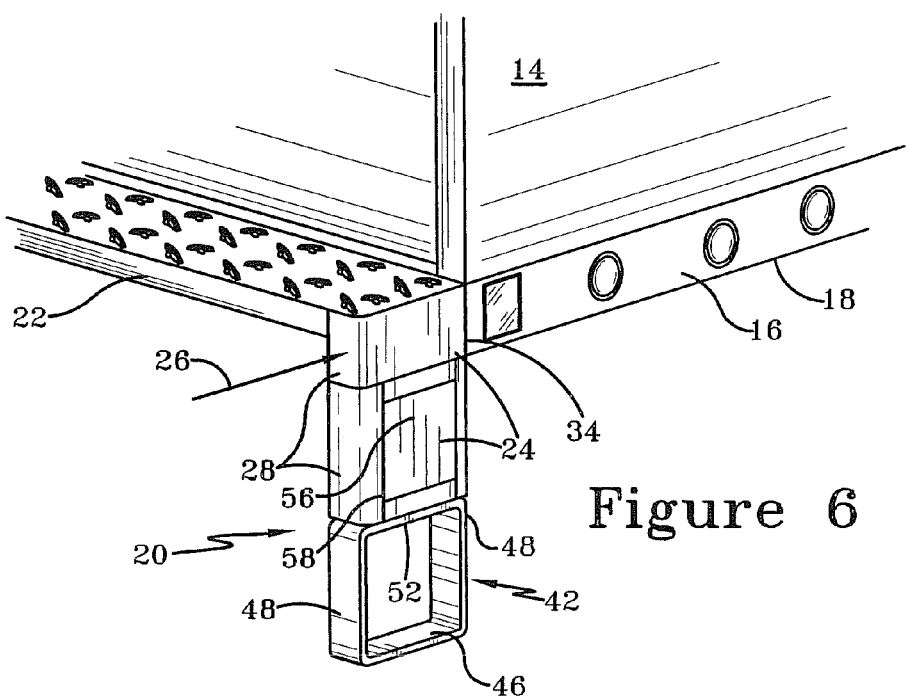
FIG. 6 is a perspective view of a dock bumper in accordance with still another embodiment of the present invention that includes a plurality of shock absorbing members and a modular step, wherein one of the shock absorbing members includes a step recess.
Figure 7:
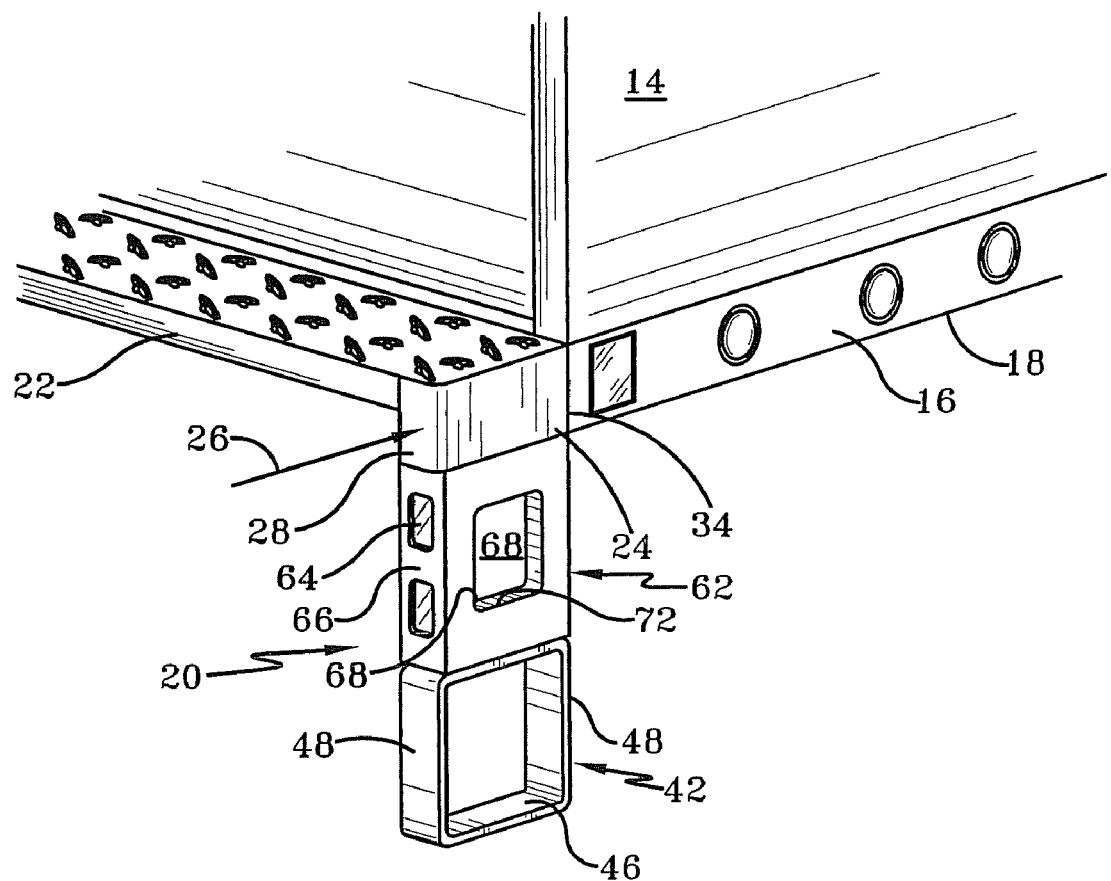
FIG. 7 is a perspective view of a dock bumper in accordance with another embodiment of the present invention that includes a modular step and a modular light array.
Figure 8:
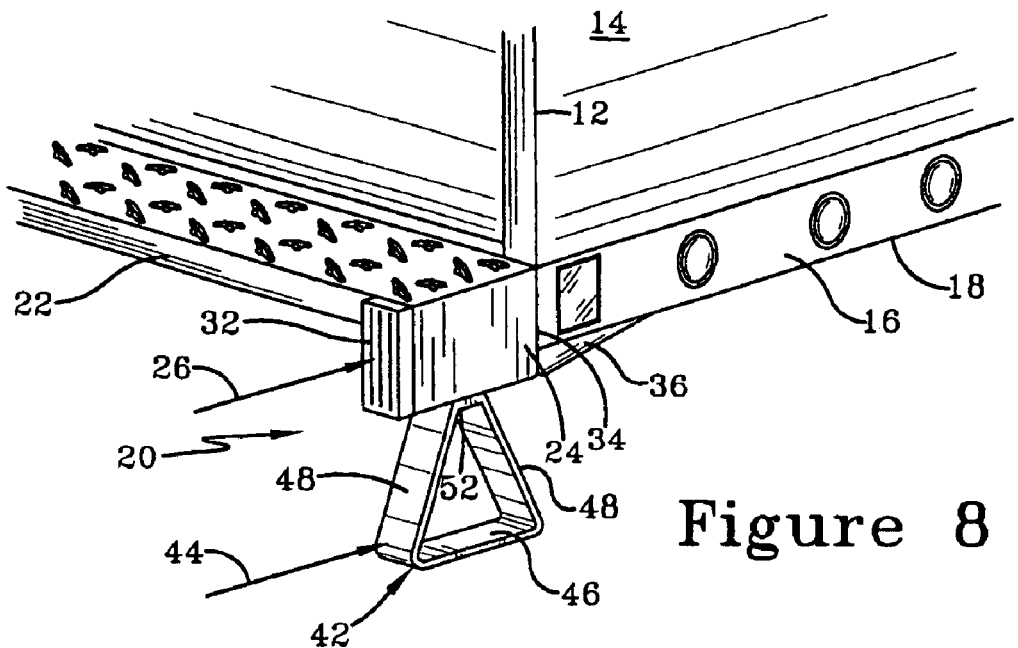
FIG. 8 is a perspective view of a dock bumper in accordance with another embodiment of the present invention that includes a substantially triangular shaped modular step.
Figure 9A:
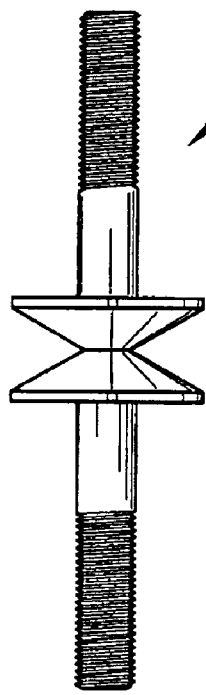
Figure 9B:
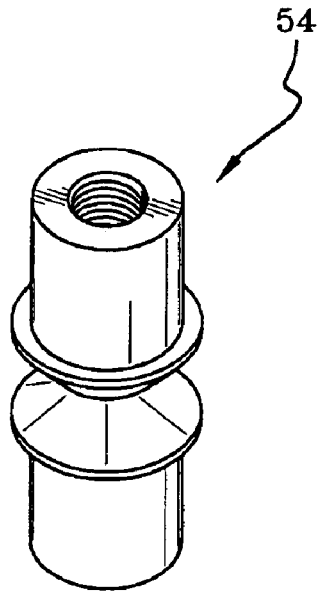

The shock-absorbing member 24 can be dimensioned to any suitable size to be installed on a particular trailer 14. In situations where the shock-absorbing member 24 is taller than the structural member 16, the brace 36 can be installed to accommodate this difference in size. For instance, a shock-absorbing member 24 with a height of eight (8) inches can be installed on trailers 14 with a structural member 16 of eight (8) or more inches without the optional brace 36, as shown in FIGS. 5-7. The eight (8) inch shock-absorbing member 24 can also be installed to contact a structural member 16 having a height of six (6) inches, but an optional brace 36 having a two (2) inch surface for contacting the shock-absorbing member 24 can also be installed to enhance the height of the structural member 16. Height, as used herein, refers to a vertical measurement of distance in a direction perpendicular to the ground on which the trailer 14 rests. For example, the height of the structural member 16 is indicated in FIG. 5 as the dimension H.

FIG. 3 shows a modular step 42 coupled to the shock-absorbing member 24 to dissipate at least a suitable portion of a force exerted on the step 42 to minimize damage to the structural member 16 contacting the proximate surface 34 of the shock-absorbing member 24. The step 42 extends below other features of the trailer 14, making it susceptible to collisions with low-lying objects such as curbs, for example, when the trailer 14 is being backed up. Such a collision with a low-lying object exerts a force in the direction of arrow 44 on the step 42. The step 42, however, is made from a generally-rigid material that is deformable when subjected to such a force. The deformable property of the step material allows at least a suitable portion of the energy from the force to be dissipated to minimize, or even prevent significant structural damage to the structural member 16. Accordingly, the step 42 is deformed, but the structural member 16 does not suffer significant damage.

According to alternate embodiments, the step 42 can be coupled to the shock-absorbing member 24 by a mechanical fastener designed to break free of the shock-absorbing member 24 when subjected to a predetermined force. If the deformation of the step 42 is insufficient to dissipate a suitable portion of the forces resulting from a collision between the step 42 and a low-lying object to protect the structural member 16, then the step 42 can optionally break free from the shock-absorbing member 24. Other embodiments use a combination of a step 42 that is deformable when subjected to a predetermined force and a breakaway fastener that decouples the step from the shock-absorbing member 24 when subjected to unacceptable forces.

As shown in FIG. 3, the step 42 can be a somewhat rectangular metallic structure with a lower tread 46 suspended by two mounting panels 48 from an overhead cross member 52. One or more mechanical fasteners (not shown) such as a bolt, screw, clamp, pin or other releasable fastener can be employed to secure the step 42 to the shock-absorbing member 24. The mechanical fastener can extend upwardly through the cross member 52 and engage a compatible receiver disposed within the shock-absorbing member 24 to couple the two components together.

Depending on the height that the back end of the trailer stands above the ground, a two or more steps 42 can be coupled to the shock-absorbing member 24, as shown in FIG. 4. Again, each step 42 can be a somewhat rectangular metallic structure with a lower tread 46 suspended by two mounting panels 48 from an overhead cross member 52. The step contiguous to the shock-absorbing member 24 is coupled thereto as described above, while the one or more mechanical fasteners 54 coupling the two or more steps 42 together can be any one or more of a bolt, screw, clamp, pin or other releasable fastener. Optionally, each mechanical fastener 54 can extend downwardly through the tread 46 of the upper step 42 and through the cross member 52 of the lower step 42 to minimize the number of protrusions on which a climber of the steps 42 could possibly stand. The exposed surface of the mechanical fasteners 54 can be flush with, or recessed beneath the exposed surface of the tread 46 on which a climber of the steps stands.

To enlarge the size of the distal surface 28 available to make contact with a wall of the loading dock or other obstruction, a secondary shock-absorbing member 24 can be coupled to the shock-absorbing member 24 described above, as shown in FIG. 5. To distinguish it from the secondary shock-absorbing member 24, the single shock-absorbing member 24 discussed above with reference to FIGS. 2-4 will be referred to as the primary shock-absorbing member 24. This distinction is in terminology only, and does not affect the structure, arrangement or properties of the two shock-absorbing members 24.

The secondary shock-absorbing member 24 shown in FIG. 5 may be located substantially in place of the step 42 shown in FIG. 3, and may be fabricated from the same materials as the first shock-absorbing member 24. The secondary shock-absorbing member 24 may be coupled to the underside of the single shock-absorbing member 24 by a mechanical fastener (not shown). A secondary brace (not shown), such as a gusset, is optionally secured to the structural member 16 to support the secondary shock-absorbing member 24 in the event of a collision with a low-lying object. Alternate embodiments include breakaway mechanical fasteners to couple the secondary shock-absorbing member 24 to the primary shock-absorbing member 24. The breakaway mechanical fasteners will decouple the primary and secondary shock-absorbing members 24 in the event of a collision of the secondary shock-absorbing member 24 with a low-lying object that results in the imposition of undesirable forces on the structural member 16. Yet other embodiments use a combination of these features.

Just as for the embodiments discussed above with a single shock-absorbing member 24, a step 42 can be coupled to the underside of the secondary shock-absorbing member 24. Since the addition of a secondary shock-absorbing member 24 can create a large step riser between this step 42 and the platform of the step bumper 22, a step recess 56 can optionally be formed in the secondary shock-absorbing member 24, as shown in FIG. 6. One climbing from the ground to the platform of the step bumper 22 can first stand on the step 42, and then on a tread 58 of the step recess 56 en route to the platform of the step bumper 22.

FIG. 7 illustrates an embodiment that includes a modular light array 62 in place of the secondary shock-absorbing member 24 of FIGS. 5 and 6. As with each of the primary shock-absorbing member 24, the secondary shock-absorbing member 24, and each step 42, the light array 62 is modular so that in the event of damage to the light array 62, it can be swapped out and replaced as a unit. One or more vehicle lights 64 are recessed inward of an exposed surface 66 of the light array 62, and electrical wiring to conduct electric energy to each light 64 is concealed within the light array 62. A step recess 68 including a light tread 72 is optionally formed within the light array 62 to minimize the step riser distance between the platform of the step bumper 22 and a lower surface upon which a climber of the steps can stand.

With reference now to FIGS. 2-7, the modularity of each of the primary shock-absorbing member 24, secondary shock-absorbing member 24, steps 42, and light array 62 make each component interchangeable. The only requirement is that a shock-absorbing member 24 must be secured adjacent to the structural member 16 to linearly transmit a force imparted on the shock-absorbing member 24 to the structural member 16. Thus, in the event that any one or more of the primary shock-absorbing member 24, secondary shock-absorbing member 24, steps 42, and light array 62 are damaged or are no longer desired, they can be decoupled by removing the selectively-releasable mechanical fasteners and replaced with any of the other components, which are also coupled together with the mechanical fasteners.

With continuing reference to FIGS. 2-7, although the step 42 is described herein as being a somewhat rectangular metallic structure with a lower tread 46 suspended by two mounting panels 48 from an overhead cross member 52, the step 42 can be any generally-rigid shape with progressively higher treads 46 leading to the platform of the step bumper 22. For example, the step 42 can include a central rail (not shown) that extends downwardly from the shock-absorbing member 24 with transversely-extending treads protruding therefrom. Yet other embodiments include a step 42 with a generally triangular shape.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A trailer, having a longitudinal axis, for use in receiving cargo from a loading dock and transporting the cargo to a destination, the trailer comprising:
    a frame comprising a plurality of structural members for supporting the cargo;
    a generally-rigid shock-absorbing member secured adjacent to a back portion of the trailer, the shock-absorbing member comprising:
        (a) a distal surface extended away from the back portion of the trailer and oriented to contact a surface of the loading dock as the trailer is backed into the loading dock; and,
        (b) a proximate surface positioned to contact at least one of the plurality of structural members at the back portion of the trailer; and,
    a modular step rigidly coupled to the shock-absorbing member to dissipate at least a portion of a force exerted on the step to minimize damage to the structural member contacting the proximate surface of the shock absorbing member, the modular step comprising:
        (a) a tread portion upon which a person can stand;
        (b) a longitudinal axis;
        (c) wherein the longitudinal axis of the modular step is substantially parallel to the longitudinal axis of the trailer; and
        (d) wherein the modular step is fabricated from a generally-rigid and deformable material.

2. The trailer according to claim 1 further comprising:
    a modular light array operatively attached to the shock-absorbing member, wherein the modular light array includes a step recess providing a tread upon which a person can stand.

3. The trailer according to claim 1, wherein the proximate surface of the shock-absorbing member is dimensioned to align flush with a lowermost surface of the structural member, and wherein the lowermost surface of the structural member is an underside of the trailer.

4. The trailer according to claim 1, wherein the shock-absorbing member is formed of a resiliently-deformable material.

5. The trailer according to claim 1 further comprising:
    a step bumper secured adjacent to the back of the trailer for bridging a gap between the trailer and the loading dock, wherein the step bumper has a cargo receiving surface over which cargo travels when being transported to and from the trailer from the loading dock, and wherein the shock-absorbing member is disposed at least partially beneath an overhanging portion of the step bumper.

6. The trailer according to claim 5, wherein a length of the modular step extending along the longitudinal axis of the modular step is substantially equal to a width of the step bumper extending along the longitudinal axis of the trailer.

7. The trailer according to claim 5, wherein a distance between the distal surface and the proximate surface of the shock-absorbing member is substantially equal to a width of the step bumper.

8. The trailer according to claim 1, wherein the modular step has a substantially triangular shape.

9. The trailer according to claim 1, wherein the shock-absorbing member is substantially formed of plastic.

10. The trailer according to claim 1, wherein the shock-absorbing member includes a metal framework encased within a protective housing of formed of rubber.

11. The trailer according to claim 1, wherein the shock-absorbing member has a height of approximately eight inches.

12. The trailer according to claim 9, wherein the shock-absorbing member includes a metal framework encased within the plastic.

13. The trailer according to claim 1, wherein the proximate surface of the shock-absorbing member has dimensions that are about the same as the dimensions of a surface of the at least one of the plurality of structural members the proximate surface contacts.

* * * * *